(12) United States Patent
Hashimoto

(10) Patent No.: US 12,487,177 B2
(45) Date of Patent: Dec. 2, 2025

(54) ENDOSCOPE CONTAMINATION DETECTION DEVICE, CONTROL DEVICE, AND ENDOSCOPE CONTAMINATION DETECTION METHOD

(71) Applicant: OLYMPUS CORPORATION, Tokyo (JP)

(72) Inventor: Yuichiro Hashimoto, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 478 days.

(21) Appl. No.: 17/899,875

(22) Filed: Aug. 31, 2022

(65) Prior Publication Data

US 2022/0404278 A1   Dec. 22, 2022

Related U.S. Application Data

(63) Continuation of application No. PCT/JP2020/008664, filed on Mar. 2, 2020.

(51) Int. Cl.
| | |
|---|---|
| *G01N 21/62* | (2006.01) |
| *A61B 1/00* | (2006.01) |
| *G01N 21/88* | (2006.01) |

(52) U.S. Cl.
CPC .............. *G01N 21/62* (2013.01); *G01N 21/88* (2013.01); *A61B 1/00* (2013.01)

(58) Field of Classification Search
CPC .... G01N 21/62; G01N 21/88; G01N 21/6486; G01N 21/8806; G01N 21/94; G01N 21/6428; G01N 21/954; G01N 2021/6417; G01N 2021/6439; G01N 2201/06113; G01N 2201/068; G01N 2201/0697; G01N 2201/10; G01N 2201/105; G01N 2201/0221; G01N 21/6456;
(Continued)

(56) References Cited

U.S. PATENT DOCUMENTS

2010/0328476 A1* 12/2010 Wagner ................ G06V 10/141
                                                        348/222.1
2012/0328175 A1   12/2012 Watanabe
(Continued)

FOREIGN PATENT DOCUMENTS

| CN | 110337259 A | 10/2019 |
|---|---|---|
| JP | H09-182600 A | 7/1997 |

(Continued)

OTHER PUBLICATIONS

International Search Report dated Apr. 7, 2020 received in PCT/JP2020/008664.

*Primary Examiner* — Georgia Y Epps
*Assistant Examiner* — Monica T Taba
(74) *Attorney, Agent, or Firm* — Scully, Scott, Murphy & Presser, P.C.

(57) ABSTRACT

An endoscope contamination detection device includes: a light source that irradiates an endoscope with light having a specific wavelength; an image sensor that receives fluorescence emitted by a deposit adhering to a surface of the endoscope; and a control device having a processor, wherein the processor acquires a signal from the image sensor, generates an image from the signal, detects luminance values of a plurality of pixels of the image, and determines a contamination degree of the endoscope, based on the luminance values.

18 Claims, 12 Drawing Sheets

(58) Field of Classification Search
CPC .. G01N 2021/6484; A61B 1/00; A61B 1/121;
A61B 1/043; A61B 1/00059; A61B
1/0684; A61B 1/07; A61B 90/98; A61B
2090/701; A61B 2090/702; A61B 90/70;
A61L 2/28; A61L 2202/24
See application file for complete search history.

(56) References Cited

U.S. PATENT DOCUMENTS

| | | | | |
|---|---|---|---|---|
| 2018/0067051 A1* | 3/2018 | Baribeau | ............... | G01N 21/954 |
| 2019/0374141 A1 | 12/2019 | Yamamoto | | |
| 2021/0386278 A1* | 12/2021 | Jackson | ............... | A61B 1/0684 |

FOREIGN PATENT DOCUMENTS

| | | |
|---|---|---|
| JP | H10-276977 A | 10/1998 |
| JP | H11-56393 A | 3/1999 |
| JP | 2003-021788 A | 1/2003 |
| JP | 2007125245 A | 5/2007 |
| JP | 2008-173399 A | 7/2008 |
| JP | 2009-066291 A | 4/2009 |
| JP | 2011-194164 A | 10/2011 |
| JP | 2013-146484 A | 8/2013 |
| JP | 2019188235 A | 10/2019 |
| WO | 2011/118288 A1 | 9/2011 |
| WO | 2019/089083 A1 | 5/2019 |

\* cited by examiner

FIG. 3

(UNIT: nm)

|  | EXCITATION FILTER | ABSORPTION FILTER | DICHROIC MIRROR |
|---|---|---|---|
| EXAMPLE 1 | 360—370 | 420—460 | 400 |
| EXAMPLE 2 | 460—495 | 510—550 | 505 |
| EXAMPLE 3 | 530—550 | 575—625 | 590 |

ENDOSCOPE CONTAMINATION DETECTION DEVICE, CONTROL DEVICE, AND ENDOSCOPE CONTAMINATION DETECTION METHOD

CROSS REFERENCE TO RELATED APPLICATION

This application is a continuation application of PCT/JP2020/008664 filed on Mar. 2, 2020, the entire contents of which are incorporated herein by this reference.

BACKGROUND OF THE INVENTION

1. Field of the Invention

The present invention relates to an endoscope contamination detection device for detecting contamination of an endoscope, a control device, and an endoscope contamination detection method.

2. Description of the Related Art

An endoscope is cleaned after use in order to prevent infectious diseases. It is not easy for an inspector to detect whether or not contamination remains on a surface of an insertion portion of the endoscope after cleaning, by the naked eye. Thus, various proposals have been disclosed which concerns a cleaning device that detects a state of a surface of an insertion portion of an endoscope after cleaning, in other words, a cleaned state.

For example, Japanese Patent Application Laid-Open Publication No. 10-276977 discloses an endoscope cleaning device that detects a degree of cleanliness on an outer surface of an endoscope by dying the outer surface of the endoscope with a dye liquid, and detecting whether or not the dye liquid adheres to the outer surface of the endoscope after cleaning.

However, in order to use the endoscope cleaning device disclosed in the above Japanese Patent Application Laid-Open Publication No. 10-276977, it becomes necessary to apply a dye liquid to the outer surface of the endoscope.

SUMMARY OF THE INVENTION

An endoscope contamination detection device according to one aspect of the present invention includes: a light source that irradiates an endoscope with light of a specific wavelength; an image sensor that receives fluorescence emitted by a deposit adhering to a surface of the endoscope; and a control device having a processor, wherein the processor acquires a signal from the image sensor, generates an image from the signal, detects luminance values of a plurality of pixels of the image, and determines the contamination degree of the endoscope based on the luminance values.

A control device according to one aspect of the present invention is a control device including a processor that controls execution of reprocessing of an endoscope, wherein the processor acquires a signal from an image sensor for receiving fluorescence emitted by a deposit adhering to an endoscope surface, and determines a contamination degree of the endoscope, based on the signal.

An endoscope contamination detection method according to one aspect of the present invention includes: irradiating an endoscope with light having a specific wavelength; receiving fluorescence emitted by a deposit adhering to a surface of the endoscope; and determining a contamination degree of the endoscope based on the received fluorescence.

BRIEF DESCRIPTION OF THE DRAWINGS

FIG. 3 shows a table showing wavelength characteristics of an excitation filter, a dichroic mirror, and an absorption filter, according to the first embodiment;

DETAILED DESCRIPTION OF THE PREFERRED EMBODIMENTS

Hereinafter, embodiments of the present invention will be described with reference to the drawings.

First Embodiment

Figure 1:
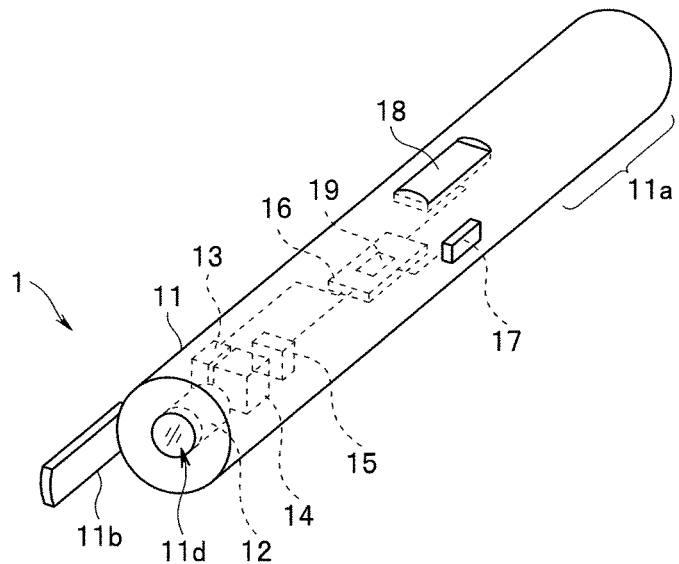
FIG. 1 shows a perspective view of an endoscope contamination detection device according to a first embodiment.

FIG. 1 shows a perspective view of an endoscope contamination detection device according to a first embodiment. The endoscope contamination detection device (hereinafter, abbreviated as a contamination detection device) 1 is a device that detects deposits (contamination) adhering to the surface of the endoscope after use, and is a handy type which a person who checks the contamination of the endoscope (hereinafter, referred to as a user) grasps by hand and uses. The contamination detection device 1 includes an objective optical system 12, a light source 13, a light splitter 14, an image sensor 15 as an image pickup device, and a control board 16, in a housing 11. The housing 11 has a cylindrical shape in FIG. 1, but the present invention is not limited thereto, and the housing 11 may have any shape as long as it is easy for a user to grasp the housing 11 by hand. The grasping portion 11a is a proximal end side portion of the housing 11. On an outer surface of the housing 11, an operation button 17 and an indicator 18 are provided which serves as an output unit.

A material of the housing 11 is not particularly limited, but for example, resin, metal, or ceramics can be used. An extending portion 11b which protrudes in a direction of a distal end on a longitudinal axis of the housing 11 is provided at the distal end of the housing 11. The extending portion 11b extends a predetermined length from the distal end portion of the housing 11. The distal end surface 11c of the housing 11 has an observation window 11d which is an opening. An image sensor 15 is arranged on a rear side of the observation window 11d. The housing 11 may include a positioning member for causing the image sensor 15 to form a focused object image on the image pickup plane of the image sensor 15. As the positioning member, the extending portion 11b illustrated in FIGS. 1 and 5 can be used. The extending portion 11b may be detachable, or may be replaced with an extending portion having an appropriate shape among a plurality of types of extending portions 11b, according to an object to be observed or a purpose. In addition, the contamination detection device 1 may include an aiming device or an autofocus function in place of the positioning member.

Figure 5:
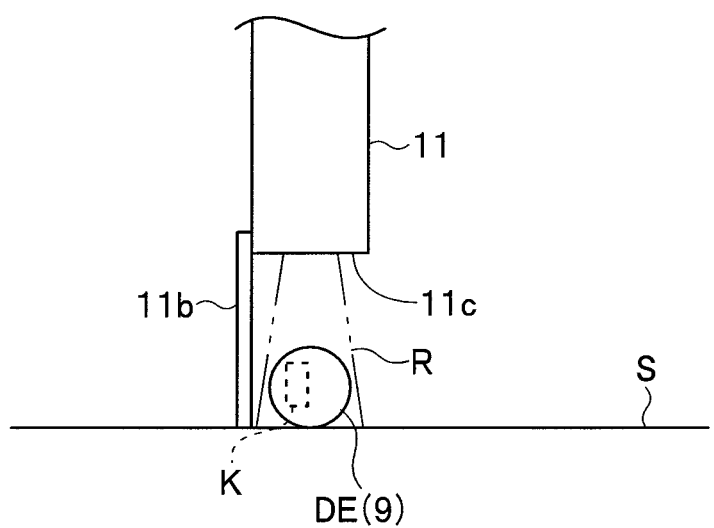
FIG. 5 shows a view for explaining a contamination detection device and an arrangement of a distal end portion, at the time when detecting the contamination of the distal end portion of an insertion portion of an endoscope, according to the first embodiment.

The objective optical system 12 is arranged on a rear side of the observation window 11d. As shown in FIG. 5 which will be described later, for example, when the user places the distal end DE of the insertion portion of the endoscope 9 on a bottom surface S of the treatment tank of the endoscope reprocessor, abuts a distal end of the extending portion 11b against the bottom surface S of the treatment tank, and directs the observation window 11d to the distal end portion DE of the insertion portion, light that has passed through the objective optical system 12 and has been emitted from the distal end portion is applied to the distal end portion DE. The fluorescence image of the distal end portion DE is formed on an image pickup plane of the image sensor 15, due to the fluorescence from the distal end portion DE. In other words, the extending portion 11b is a member for adjusting a distance between an object and the observation window 11d so as to be constant, for forming an object image on the image pickup plane of the image sensor 15. In other words, the extending portion 11b is a distance adjustment member which adjusts the distance between the observation window 11d and the endoscope so as to be constant.

The light source 13 is a mercury lamp or the like. The light of the light source 13 is supplied to the light splitter 14 by a light irradiation optical system 13a.

Here, the light source 13 is provided in the housing 11, but the light source 13 may be provided in an external device, and the light from the light source 13 may be configured to be guided to the light splitter 14 in the housing 11 by an unillustrated optical fiber or the like.

The light splitter 14 is arranged on a proximal end side of the objective optical system 12. As will be described later, the light splitter 14 includes a plurality of optical elements which split light so as to irradiate contaminants (deposits) adhering to a surface (more specifically, surface of distal end portion of insertion portion) of the endoscope with a predetermined wavelength, and to cause the contaminants to irradiate the image sensor 15 with the excitation light.

The image sensor 15 is a CMOS area image sensor or the like. The image sensor 15 serving as a light receiving unit is arranged on the proximal end side of the light splitter 14.

The control board 16 is a control device having a processor 19 and various circuits.

As described above, the endoscope contamination detection device 1 includes: the light source 13 which irradiates the endoscope with the light having the specific wavelength; the image sensor 15 which receives the fluorescence emitted by the deposit adhering to the surface of the endoscope; and the control device 16 (control board) having the processor 19.

When the operation button 17 is pressed down, the processor 19 drives the light source 13 according to the button operation, also drives the image sensor 15, receives the image pickup signal, generates an image, and performs predetermined image processing. Furthermore, the processor 19 generates an output signal corresponding to the result of the predetermined image processing, and outputs the output signal to the indicator 18. The configuration of the processor 19 will be described later.

Figure 2:
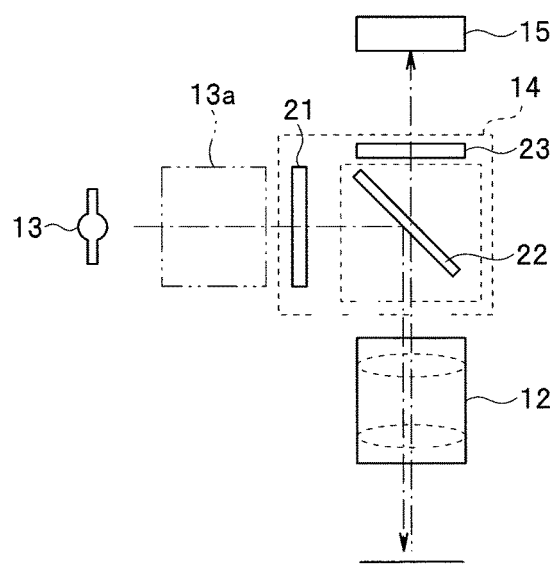
FIG. 2 shows a diagram showing a configuration of an optical path from a light source to an object, and an image pickup optical system which receives fluorescence from the object, according to the first embodiment.

FIG. 2 is a diagram showing a configuration of an optical path from a light source to an object, and an image pickup optical system which receives fluorescence from the object. The light from the light source 13 is emitted to the excitation filter 21 through the light irradiation optical system 13a. The light which has passed through the excitation filter 21 is incident on the light splitter 14. The light splitter 14 includes a dichroic mirror 22. The dichroic mirror 22 is arranged in the light splitter 14 so as to reflect light from the excitation filter 21 toward the objective optical system 12. Here, the dichroic mirror 22 is arranged so as to bend the light which has passed through the excitation filter 21 at a right angle, and emit the resultant light to the objective optical system 12.

The light incident on the objective optical system 12 is emitted from the observation window 11d and is applied to the object. Therefore, the light source 13, the excitation filter 21 and the dichroic mirror 22 constitute a light irradiating unit or a light irradiator that irradiates the endoscope with light having a specific wavelength. As will be described later, the light applied to the object functions as an excitation light for causing the subject to generate fluorescence, and the fluorescence is emitted from the object and is incident on the objective optical system 12 through the observation window 11d.

The fluorescence is incident on the dichroic mirror 22 through the objective optical system 12. The fluorescence passes through the dichroic mirror 22 and is incident on the absorption filter 23. The fluorescence passes through the absorption filter 23, and is applied to the image pickup plane of the image sensor 15. Therefore, the dichroic mirror 22, the absorption filter 23 and the image sensor 15 constitute a light receiving unit that receives the fluorescence emitted by the contaminant adhering to the surface of the endoscope.

Here, optical characteristics of each optical element will be described. In the present embodiment, a living tissue which is a main component of the contaminants is used for the excitation light. The living tissue varies depending on the insertion destination of the endoscope and the disease state of a subject; and examples include red blood cells and bile. In the case of the red blood cells, a wavelength is used at which hemoglobin contained in the red blood cells generates autologous fluorescence. In the case of the bile, a wavelength is used at which heme contained in bile or heme metabolites such as bilirubin or bile dye generate autologous fluorescence. In other words, the present embodiment detects the autologous fluorescence of the contaminant-containing substances adhering to the outer surface of the endoscope after use. In other words, contamination is illuminated without the use of fluorescence markers. For this reason, each filter has the following characteristics.

FIG. 3 is a table showing wavelength characteristics of the excitation filter 21, the dichroic mirror 22, and the absorption filter 23. For example, according to an example 1 of FIG. 3, the excitation filter 21 has characteristics of transmitting light having a wavelength of 360 nm to 370 nm and generating excitation light; the dichroic mirror 22 has characteristics of reflecting light having a wavelength of shorter than 400 nm among the excitation light generated by the excitation filter and transmitting light having a wavelength of 400 nm or longer; and the absorption filter 23 has characteristics of transmitting only light having a wavelength of 420 nm to 460 nm among the autologous fluorescence emitted from contaminants. If each optical element has such optical characteristics, illumination light having a wavelength of, for example, 365 nm is emitted as excitation light, and the image sensor 15 can pick up an image of the autologous fluorescence of the object. In the example 1, the specific wavelength of the light applied to the endoscope is 360 nm or longer.

Alternatively, according to the example 2 of FIG. 3, the excitation filter 21 has characteristics of transmitting light having a wavelength of 460 nm to 495 nm and generating excitation light; the dichroic mirror 22 has characteristics of reflecting light having a wavelength of shorter than 505 nm among the excitation light generated by the excitation filter and transmitting light having a wavelength of 505 nm or longer; and the absorption filter 23 has characteristics of transmitting only light having a wavelength of 510 nm to 550 nm among the autologous fluorescence emitted from contaminants. If each optical element has such optical characteristics, illumination light having a wavelength of, for example, 490 nm is emitted as excitation light, and the image sensor 15 can pick up an image of the autologous fluorescence of the object. In Example 2, the specific wavelength of the light applied to the endoscope is a wavelength of 460 nm or longer; the excitation filter 21 transmits light having a wavelength of 460 nm or longer; the dichroic mirror 22 reflects light having a wavelength of shorter than 505 nm, and transmits light having a wavelength of 505 nm or longer; and the absorption filter 23 transmits light having a wavelength of 510 nm to 550 nm.

In addition, according to the example 3 of FIG. 3, the excitation filter 21 has characteristics of transmitting light having a wavelength of 530 nm to 550 nm and generating excitation light; the dichroic mirror 22 has characteristics of reflecting light having a wavelength of shorter than 570 nm among the excitation light generated by the excitation filter and transmitting light having a wavelength of 570 nm or longer; and the absorption filter 23 has characteristic of transmitting only light having a wavelength of 575 nm to 625 nm among the autologous fluorescence emitted from contaminants. If each optical element has such optical characteristics, illumination light having a wavelength of, for example, 546 nm is emitted as excitation light, and the image sensor 15 can pick up an image of the autologous fluorescence of the object. In Example 3, the specific wavelength of the light applied to the endoscope is a wavelength of 530 nm or longer; the excitation filter 21 transmits light having a wavelength of 530 nm or longer; the dichroic mirror 22 reflects light having a wavelength of shorter than 570 nm, and transmits light having a wavelength of 570 nm or longer; and the absorption filter 23 transmits light having a wavelength of 575 nm to 625 nm.

According to experiments conducted by the applicant, it has been found out that hemoglobin and bile generate autologous fluorescence when being irradiated with light having a specific wavelength or longer as the excitation light. The specific wavelength preferably includes the excitation light having a wavelength of 360 nm or longer, and more preferably includes the excitation light having a wavelength of 460 nm or longer. In particular, when the excitation light contains light having a wavelength of 490 nm or 546 nm, hemoglobin and bile tend to easily and strongly generate autologous fluorescence, in other words, tend to be easily excited, and the image sensor 15 picks up an image so as to be capable of identifying fine contaminations.

In place of the dichroic mirror 22, quartz glass may be used. The quartz glass reflects the excitation light and transmits light having a wavelength of 400 nm or longer and 700 nm or shorter, and accordingly, can apply light having a wider range of wavelengths to the image sensor 15.

Figure 4:
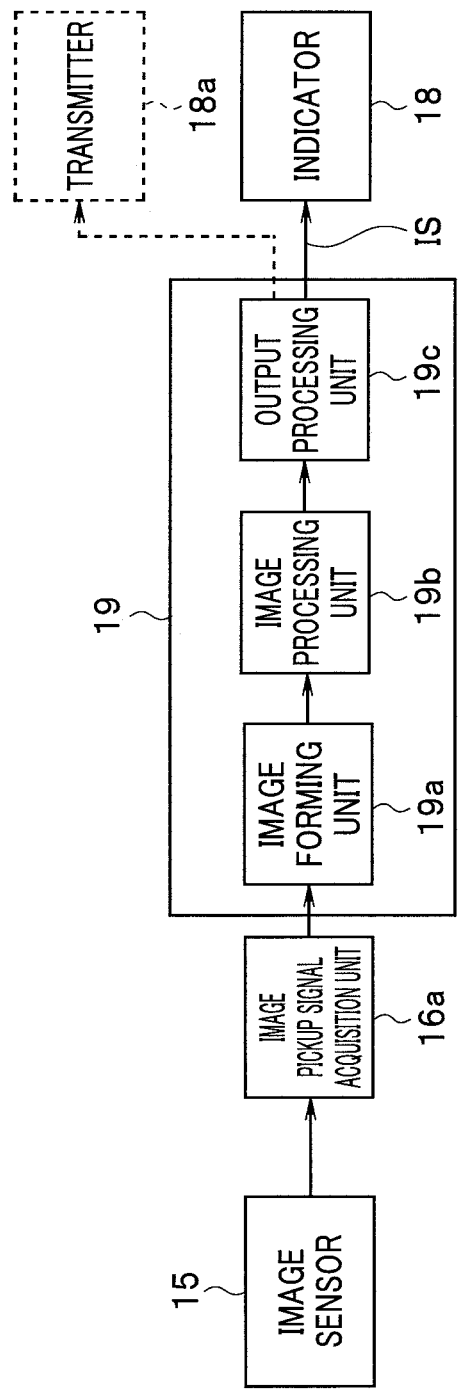
FIG. 4 shows a configuration diagram including functional blocks of a processor of the endoscope contamination detection device, according to the first embodiment.

FIG. 4 is a configuration diagram including functional blocks of a processor 19 of the endoscope contamination detection device, according to the present embodiment. Note that FIG. 4 shows only a portion related to processing of the image pickup signal from the image sensor 15. The processor 19 includes an image forming unit 19a, an image processing unit 19b, and an output processing unit 19c.

The processor 19 includes a central processing unit (CPU), a ROM, a RAM and the like, reads a software program stored in the ROM, develops the software program in the RAM, and executes the software program; and thereby realizes functions of each unit such as the image forming unit 19a.

The processor 19 may be configured by a semiconductor device such as an FPGA (field programmable gate array), an electronic circuit, or the like; and the functions of each unit such as the image forming unit 19a may be implemented by the circuit.

An image pickup signal acquisition unit 16a is an input circuit that acquires an image pickup signal from the image sensor 15 and outputs the image pickup signal to the processor 19; and is included in the control board 16.

The image forming unit 19a forms an image (second image) of fluorescence from an object, which has been formed on the image pickup plane of the image sensor 15, based on the image pickup signal of the first image from the image pickup signal acquisition unit 16a. In other words, the image forming unit 19a forms a fluorescence image from the received fluorescence.

The image processing unit 19b performs predetermined image processing, in this case, binarization processing, on a fluorescence image composed of a plurality of pixels formed in the image forming unit 19a, and generates a binarized image. The binarization processing detects the luminance value of each pixel of the first image, compares the set threshold value TH with the luminance value of each detected pixel, and generates a fluorescence image (second image) of only pixels having the threshold value TH or higher, based on the image (first image) formed in the image forming unit 19a. As will be described later, the second image which is the binarized image is an image showing a contaminated portion by the contaminant. The contaminated portion contains blood or bile. Therefore, the image processing unit 19b subjects the fluorescence image (first image) to the image processing, and forms the image (second image) in which the contaminated portion by the contaminant is emphasized.

The output processing unit 19c includes a circuit that generates an output signal IS based on the binarized image from the image processing unit 19b, and outputs the output signal IS to the indicator 18. As will be described later, the output processing unit 19c may be configured to output the image data of the binarized image. Therefore, the image processing unit 19b and the output processing unit 19c configure an image output unit that outputs an image (second image) obtained by emphasizing the contaminated portion.

In other words, when the operation button 17 is pressed, the drive circuit for driving the image sensor 15 operates, which is provided on the control board 16, and generates a drive signal for driving the image sensor 15. The image pickup signal acquisition unit 16a acquires the image pickup signal of the first image from the image sensor 15. When the image pickup signal acquisition unit 16a receives the image pickup signal from the image sensor 15, the image pickup signal acquisition unit 16a supplies the image pickup signal of the first image to the image forming unit 19a. The image processing unit 19b of the processor 19 subjects the image pickup signal to the binarization processing, and outputs the image signal (second image) of the binarized image to the output processing unit 19c.

The output processing unit 19c of the processor 19 determines the presence or absence of the contamination or the degree of the contamination (hereinafter, referred to as "contamination degree") of the endoscope based on the binarized image, generates the output signal IS which indicates the contamination degree, and outputs the signal to the indicator 18. In other words, the output processing unit 19c constitutes a contamination degree determining unit that determines the contamination degree of the endoscope from the binarized image. In the present embodiment, the output signal IS is a signal for displaying a message on the indicator 18, but may be a signal for outputting a predetermined sound by a sound output device such as a buzzer, in place of the indicator 18.

The output signal IS as a signal of a determination result of the contamination is a signal indicating the contamination degree. For example, the output signal IS is a message that indicates the presence or absence of the pixel having a luminance value of a predetermined threshold value TH or higher, or a signal that indicates the contamination degree by indices such as small, medium and large, based on a ratio of the number of pixels having luminance values of the predetermined threshold value TH or higher to the total number of pixels.

When the luminance value of the pixel is in a range of 0 to 255, for example, the predetermined threshold value TH is 70. As for the calculation of the luminance value, an RGB value is calculated by the following equation.

$$\text{Luminance} = R*0.21 + G*0.72 + B*0.07 \quad \text{(Equation)}$$

For example, if the pixel having a luminance value of the predetermined threshold value TH or higher does not exist in the image, the output processing unit 19c generates a display message such as "no severe contamination", and displays the message on the indicator 18. When the number of the pixels having luminance values of the predetermined threshold value TH or higher is the predetermined number or more, the output processing unit 19c generates a display message such as "contaminated, or contamination degree is large", and displays the message on the indicator 18. For example, when the ratio of the number of the pixels having luminance values of the predetermined threshold value TH or higher to the total number of pixels is 0.05 or less, the "contamination degree" is determined to be "small", and when the ratio of the number of the pixels having luminance values of the predetermined threshold value TH or higher to the total number of pixels is 0.3 or more, the "contamination degree" is determined to be "large". In this case, the number of the pixels having luminance values of the predetermined threshold value TH or higher is proportional to an area in the fluorescence image.

(Operation)

An operation of the above described contamination detection device 1 will be described. FIG. 5 is a diagram for explaining an arrangement of the contamination detection device 1 and the distal end portion of the insertion portion of the endoscope 9, at the time when the contamination of the distal end portion is detected. In FIG. 5, K denotes a raising base (forceps elevator) that is provided in the distal end portion DE.

For example, the user places the distal end portion DE on a bottom surface S of the treatment tank of the endoscope reprocessor, and abuts the distal end of the extending portion 11b against the bottom surface S so that the distal end portion DE comes within an image pickup range R of the observation window 11d. In the state, the user presses the operation button 17, and then, the excitation light having a predetermined wavelength from the light source 13 is emitted through the observation window 11d. If a contaminant containing hemoglobin adheres to the surface of the distal end portion DE, the contaminant generates fluorescence due to the excitation light incident on the distal end portion DE.

The fluorescence is incident on the image sensor 15 from the observation window 11d through the objective optical system 12, the dichroic mirror 22 and the absorption filter 23. As a result, the image sensor 15 outputs the image pickup signal of the fluorescence image of the distal end portion DE.

The image processing unit 19b generates a binarized image from the fluorescence image. The output processing unit 19c generates the output signal IS based on the binarized fluorescence image, and outputs the signal to the indicator 18.

The user looks at the contamination degree displayed on the indicator 18, and can set a reprocessing time period in the reprocessing by the endoscope reprocessor. For example, if the contamination is not severe, the user sets the reprocessing time period to the normal set time period, and if the contamination is severe, the user sets the reprocessing time period to be longer than the normal set time period. In addition, if the contamination is severe, the user can add a special cleaning such as a gas-liquid two-phase flow to a cleaning menu, or change the type of detergent to detergent containing enzyme.

Here, the contamination degree is outputted based on the image which has been obtained by the binarization processing, and is displayed on the indicator 18, but the contamination degree may be outputted according to the level of the luminance value of the pixel having a luminance value of the threshold value TH or higher, as described above.

For example, the image processing unit 19b generates an image having a luminance value of the threshold value TH or higher, and determines "large", "middle" or "small" of the contamination degree, according to the level of the luminance value of each pixel. In other words, the contamination degree may be outputted not only based on the presence or absence and the number of pixels having luminance values of the threshold value TH or higher in the binarized image, but also in consideration of the level of the luminance value of each pixel contained in the fluorescence image. When the contamination is dried, the concentration of hemoglobin or the like contained in the contamination enhances, and accordingly, the contamination degree can be determined according to the level of the luminance value.

Furthermore, instead of the number of pixels having luminance values of the threshold value TH or higher in the binarized image, "large", "middle" or "small" of the contamination degree may be determined according to the number of lumps of pixels having luminance values of the threshold value TH or higher in the binarized image.

It is also acceptable to determine "large", "middle" or "small" of the contamination degree, in consideration of the number of lumps of the pixels of the threshold value TH or higher, in the binarized image, in addition to the number of the pixels having luminance values of the threshold value TH or higher, in the binarized image.

Here, the inspection result is displayed in the form of a message on the indicator 18 provided in the contamination detection device 1, but furthermore, it is also acceptable to provide the transmitter 18a in the contamination detection device 1, as shown by a dotted line in FIG. 4, and transmit the output signal IS to an external device through the transmitter 18a which transmits the signal by wire or wireless. In this case, the message of the output signal IS, which has been transmitted from the transmitter 18a, is received by a personal computer or the like, which is an external device (hereinafter, referred to as a "PC"), and is displayed on a monitor of the PC. Therefore, the user can know the contamination degree of the endoscope, from the message displayed on the monitor, and set a cleaning time period or the like in the endoscope reprocessor. The external device may be an endoscope reprocessor; and in this case, the user can look at the message displayed on the indicator of the endoscope reprocessor, and set the cleaning time period or the like of the endoscope reprocessor.

Furthermore, when the external device is the endoscope reprocessor, it is also acceptable to cause the endoscope reprocessor to automatically set the cleaning time period or the like according to the received output signal IS.

In addition, in the above described example, the output processing unit 19c generates a message as the output signal IS, based on the binarized image, but it is also acceptable to cause the contamination detection device 1 to transmit the image data of the binarized image to an external device, for example, a PC, and cause the external device to display the binarized image as the output signal IS on the monitor, by an image of a predetermined color, for example, a red image. In other words, the image processing unit 19b emphasizes the contaminated portion by the binarization processing, and converts the fluorescence image into a binarized image in the binarization processing so that the fluorescence image has two gradations that display the pixels having luminance values of the predetermined threshold value TH or higher, by a first color (for example, red), and the pixels having luminance values lower than the predetermined threshold value TH, by a second color (for example, black) which is different from the first color. Therefore, the output processing unit 19c constitutes an output unit that outputs image data of a binarized image to an external device through the transmitter 18a.

In this case, the user looks at the binarized image displayed on the monitor, and can determine the contamination degree. The user sets the processing time period of the reprocessing by the endoscope reprocessor, according to the contamination degree of the endoscope.

As described above, according to the above described present embodiment, there can be provided an endoscope contamination detection device which detects the contamination of the endoscope without the need of complicated work, an endoscope reprocessor, and an endoscope contamination detection method.

There is a case where the distal end portion DE of the insertion portion of the endoscope includes a raising base K that can be rotated around a predetermined axis. In this case, the distal end portion DE has a complicated shape and a depressed portion. The raising base K is used for changing a direction of a forceps or the like. According to the contamination detection device 1 of the above described embodiment, the user can easily check the contamination degree of the distal end portion DE having the complicated shape.

When the endoscope contamination detection device determines the contamination degree of the distal end portion DE having the raising base K, the endoscope contamination detection device emits light having a specific wavelength, when the rotation angle of the raising base K is a first angle, and determines the contamination degree; and also when the rotation angle of the raising base K is the second angle different from the first angle, emits light having a specific wavelength and determines the contamination degree. By determining the contamination degree at a plurality of rotation angles, the endoscope contamination detection device can reliably determine the contamination degree of the raising base K.

The contamination detection device 1 according to the above described embodiment has a stick shape, and accordingly, the user can check the contamination at a desired place, by irradiating a desired place of the insertion portion with the excitation light, without bringing the contamination detection device 1 into contact with an unsterilized endoscope.

In addition, by using the contamination detection device 1 of the above described embodiment, the user can check the contamination of the insertion portion of the endoscope without contacting the endoscope.

(Modification)

In the above described first embodiment, the image processing unit 19b generates a binarized image by the binarization processing, and the output processing unit 19c outputs the output signal IS based on the binarized image, but it is also acceptable to provide an inference unit which uses deep learning, in the processor 19, and cause the inference unit to infer the contamination degree.

Figure 6:
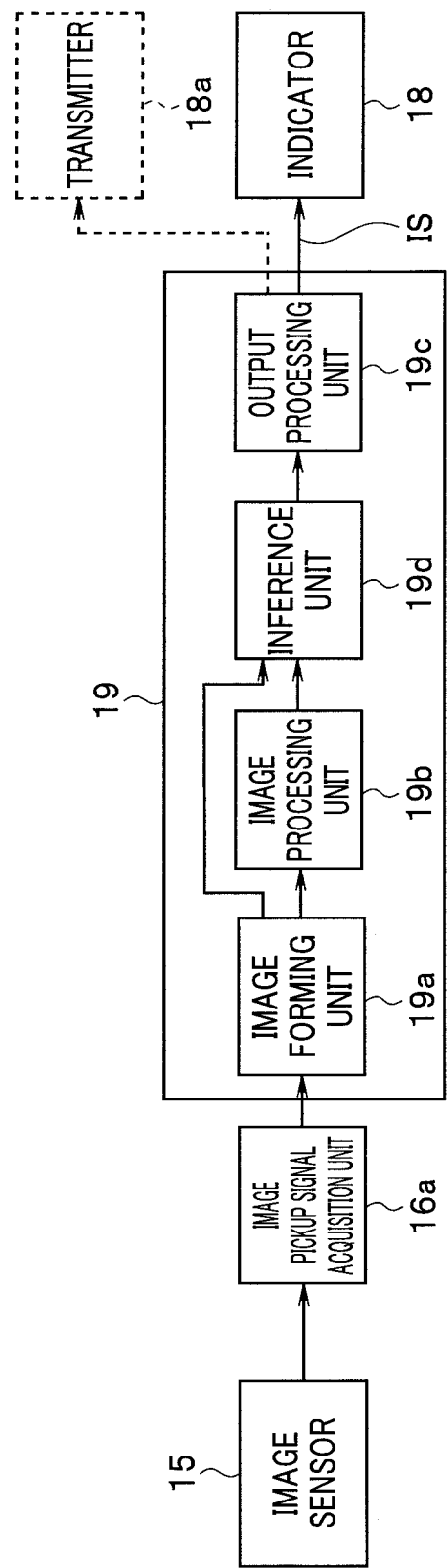
FIG. 6 shows a configuration diagram including functional blocks of a processor of an endoscope contamination detection device, according to a modification of the first embodiment.

FIG. 6 shows a configuration diagram including functional blocks of a processor of the endoscope contamination detection device, according to the present modification. In FIG. 6, an inference unit 19d is provided between the image processing unit 19b and the output processing unit 19c.

Figure 7:
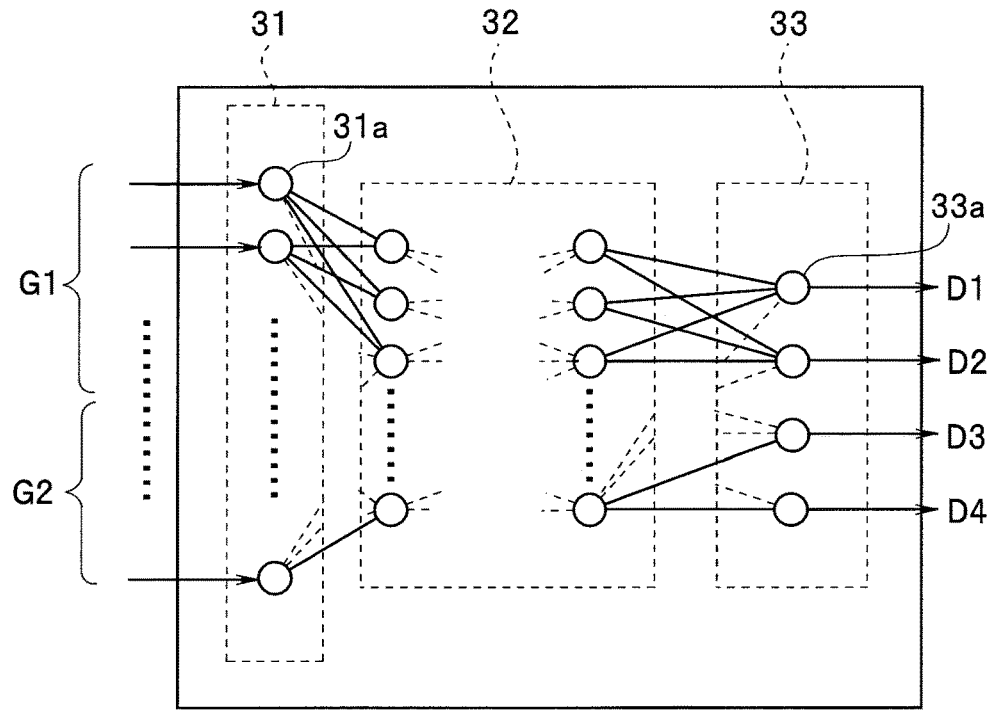
FIG. 7 shows a diagram showing a configuration example of a neural network included in an inference unit, according to the modification of the first embodiment.

The inference unit 19d performs inference processing which uses an inference model using deep learning. FIG. 7 is a diagram showing a configuration example of a neural network contained in the inference unit 19d. The inference model is generated by using the neural network shown in FIG. 7. The neural network includes an input layer 31, a hidden layer 32, and an output layer 33. The input layer 31 includes a plurality of input units 31a corresponding to the number of pixels, for inputting the image data G1 from the image forming unit 19a and the image data G2 from the image processing unit 19b. The hidden layer 32 includes a plurality of nodes. The output layer 33 here includes four output units 33a. The first output unit among the four output units is an output D1 of the contamination degree "large", the second output unit is an output D2 of the contamination degree "small", the third output unit is an output D3 of the contamination degree "presence", and the fourth output unit is an output D4 of the contamination degree "absence".

A learning model of the neural network is generated by using the image data G1 and G2 and the four output data D1 to D4 serving as label data, as teacher data, giving a large amount of the teacher data to the neural network, and causing the neural network to learn connections between the plurality of nodes of the hidden layer 32, and the values of coefficients and the like. For example, the neural network is convolutional neural networks.

The inference unit 19d uses the inference model generated as described above, and generates outputs of each of outputs D1 to D4, based on the two input image data. In other words, the inference unit 19d infers the contamination degree due to the contaminant adhering to the distal end portion DE, by using the inference model which has been created by using the image data G1 and G2.

Figure 8:
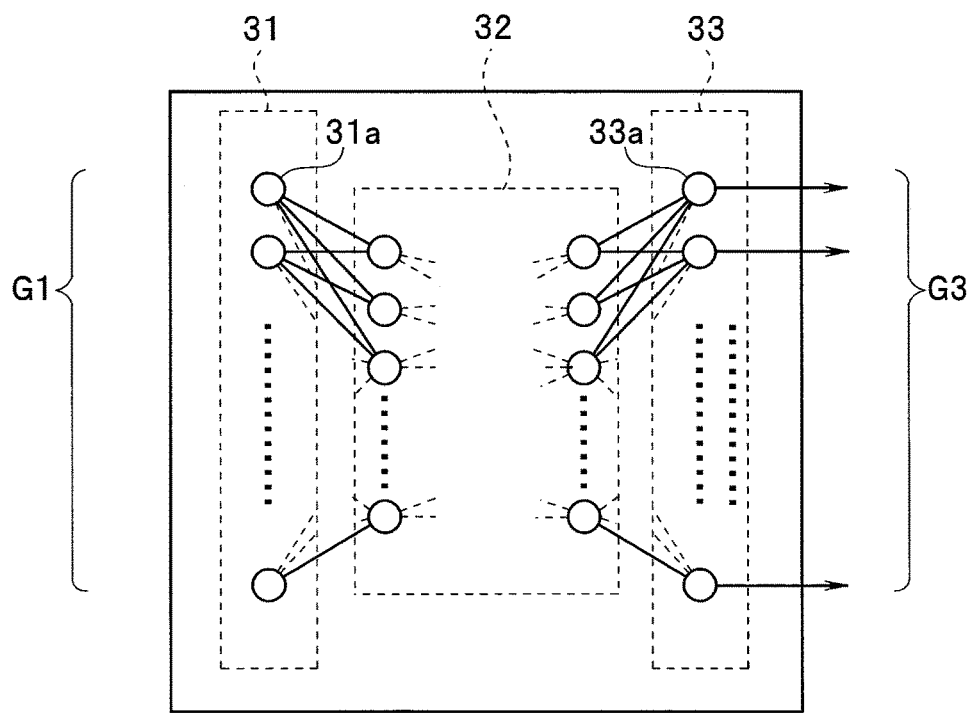
FIG. 8 shows a diagram showing a configuration example of another neural network related to a modification of the inference unit, according to the modification of the first embodiment.
Figure 9:
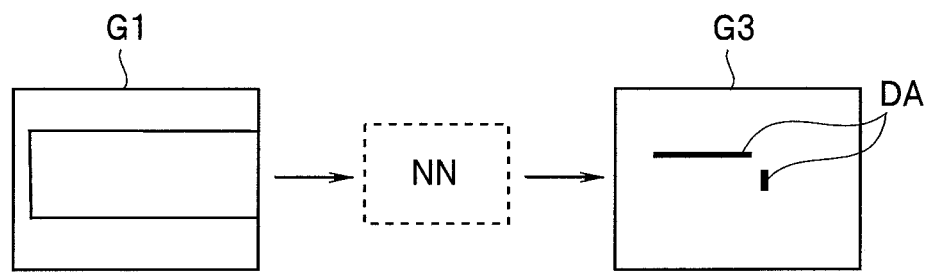
FIG. 9 shows a diagram for explaining that the neural network according to the modification of the first embodiment outputs image data indicating a contaminated region, based on input image data.

The output layer 33 may be configured so as to output the image data of the binarized image, which indicates a contaminated region. FIG. 8 is a diagram showing a configuration example of another neural network according to the modification of the inference unit 19d. FIG. 9 is a diagram for explaining that the neural network outputs image data indicating a contaminated region, based on the input image data.

The image data G1 from the image forming unit 19a is inputted into the input layer 31, and the output layer 33 outputs an image data G3 for displaying an image including the contaminated region DA, based on the image data G1. A learning model of the neural network is generated by using the image data G1 and the image data G3 of the binarized image including the contaminated region, which serves as the label data, as teacher data, giving a large amount of the teacher data to the neural network, and causing the neural network to learn the connections between the plurality of nodes of the hidden layer 32, and the values of coefficients and the like. Therefore, in the present modification, the inference unit 19d is used in place of the image processing unit 19b, and the output of the image forming unit 19a is supplied to the inference unit 19d. In other words, the inference unit 19d constitutes an image processing unit that forms an image in which a contaminated portion by the contaminant is emphasized. The inference unit 19d infers and generates an image showing a region of the contaminated portion, by using the inference model which has been created by using the image data G1. The output processing unit 19c outputs image data of an image that indicates the region of the contaminated portion, which has been inferred by the inference unit 19d.

Therefore, by using the neural network in this way, the inference unit 19d outputs image data of an image including the contaminated region DA which has been inferred by giving image data G1, as shown in FIG. 9.

As described above, according to the present modification as well, the same effect as the above described embodiment can be obtained.

Second Embodiment

The contamination detection device of the first embodiment has a stick shape, but a contamination detection device of a second embodiment has a dome shape.

Figure 10:
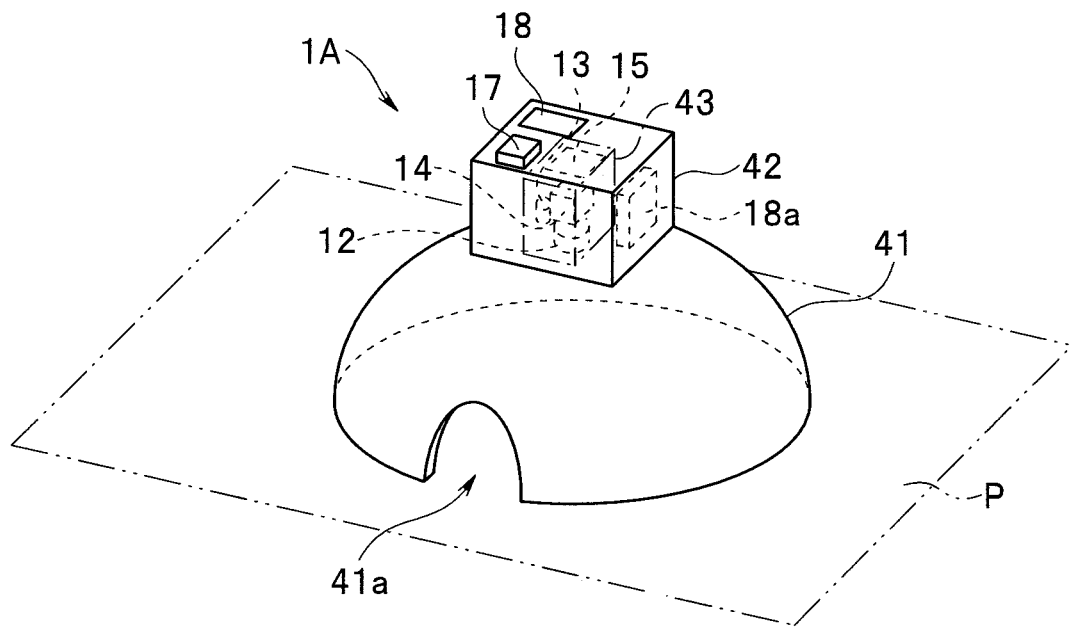
FIG. 10 shows a perspective view of a contamination detection device according to a second embodiment, as viewed from a grasping portion side.
Figure 11:
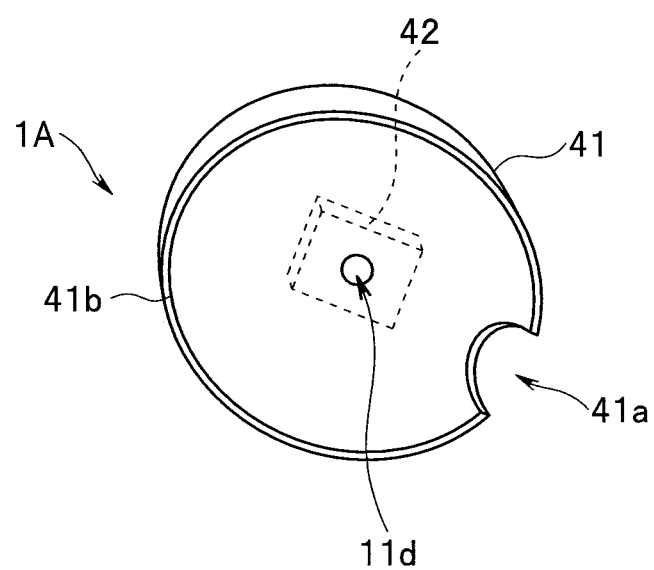
FIG. 11 shows a perspective view of a cover of the endoscope contamination detection device according to the second embodiment, as viewed from the bottom surface side.

In the following description, the same components as those in the first embodiment are designated by the same reference numerals, and the description will be omitted. FIGS. 10 and 11 are perspective views of a contamination detection device 1A according to the second embodiment. FIG. 10 is a perspective view of the contamination detection device 1A according to the second embodiment, as viewed from a grasping portion side. FIG. 11 is a perspective view of a cover of the contamination detection device 1A according to the second embodiment, as viewed from a bottom surface side. The contamination detection device 1A includes a hemisphere-shaped cover 41 having a space inside and a grasping portion 42. The grasping portion 42 is provided with the operation button 17 and the indicator 18. In a space in the grasping portion 42, there are built the light source 13, the light irradiation optical system 13a, the light splitter 14, the objective optical system 12, the excitation filter 21, the dichroic mirror 22, the absorption filter 23, the image sensor 15, and the control board 16. In FIG. 10, a detection unit 43 provided in the grasping portion 42 is shown by an alternate long and short dash line. The detection unit 43 includes the light source 13, the light irradiation optical system 13a, the light splitter 14, the objective optical system 12, the excitation filter 21, the dichroic mirror 22, the absorption filter 23, the image sensor 15, and the control board 16. Furthermore, the transmitter 18a which is a wireless transmitter may be provided in the grasping portion 42.

A notch portion 41a is formed in a part of the cover 41. As will be described later, the notch portion 41a is an avoidance portion for preventing an outer peripheral portion of the insertion portion IP from hitting the cover 41, when the cover 41 has covered the distal end portion DE of the insertion portion of the endoscope. The observation window 11d is provided at a vertex portion in the inside of the cover 41.

The objective optical system 12 is arranged at the back of the observation window 11d, and the objective optical system 12 is configured so that the focal point of the objective optical system 12 is substantially positioned on a virtual plane P including an edge portion 41b of the hemisphere-shaped cover 41. Therefore, as will be described later, when the insertion portion IP is fitted to the notch portion 41a, and the distal end portion DE is positioned below the observation window 11d, the fluorescence image of the distal end portion DE is formed on the image pickup plane of the image sensor 15.

Figure 12:
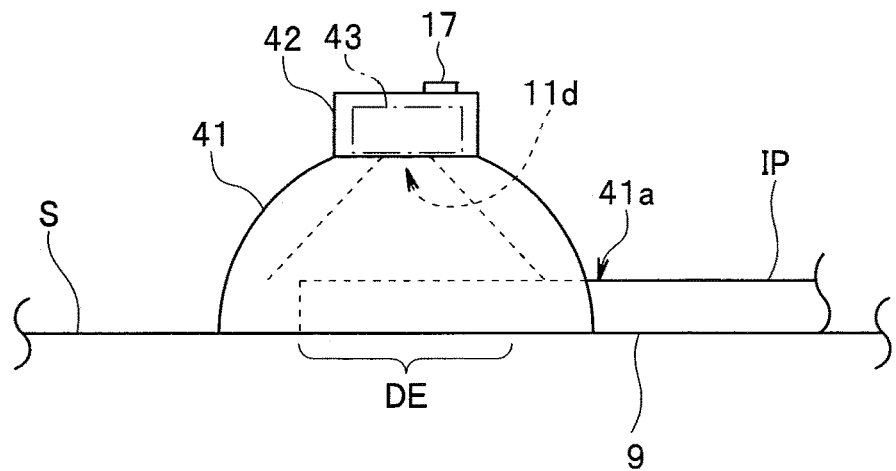
FIG. 12 shows a diagram for explaining a method of using the endoscope contamination detection device according to the second embodiment.

FIG. 12 is a diagram for explaining a method of using the contamination detection device 1A according to the second embodiment. The user can prevent external light from entering the observation window 11d, by placing the circular edge portion 41b of the cover 41 on, for example, a sink S at the time of the bedside cleaning or the bottom surface S of the treatment tank of the endoscope reprocessor, and fitting the insertion portion IP of the endoscope 9 to the notch portion 41a. In this state, the cover 41 functions similarly to a simple dark room, and when the operation button 17 is operated, light from the light source 13 is applied to the distal end portion DE as the excitation light.

Fluorescence from the contaminant on the distal end portion DE forms an image on the image pickup plane of the image sensor 15. The output processing unit 19c outputs the output signal IS to the indicator 18, based on the binarized image generated in the image processing unit 19b. By using the contamination detection device 1A, the user can check the contamination of the insertion portion of the endoscope without contacting the endoscope.

The output processing unit 19c may transmit the output signal IS from the transmitter 18a to an external device. For example, the output signal IS is transmitted to a PC, and the message is displayed on a monitor of the PC. Alternatively, the output signal IS is transmitted to the endoscope reprocessor, and the cleaning time period and the like are automatically set according to the output signal IS.

The contamination detection device 1A of the present embodiment may also transmit the image data of the fluorescence image of the binarized image as the output signal IS, and/or include an inference unit 19d in which the processor 19 of the detection unit 43 performs inference by using an inference model using the deep learning, as described in the first embodiment.

Therefore, the contamination detection device 1A of the second embodiment can also obtain the same effect as the contamination detection device 1 of the above described first embodiment.

Third Embodiment

The contamination detection device of the first embodiment has a stick shape, but the contamination detection device of the third embodiment has a book shape.

Figure 13:
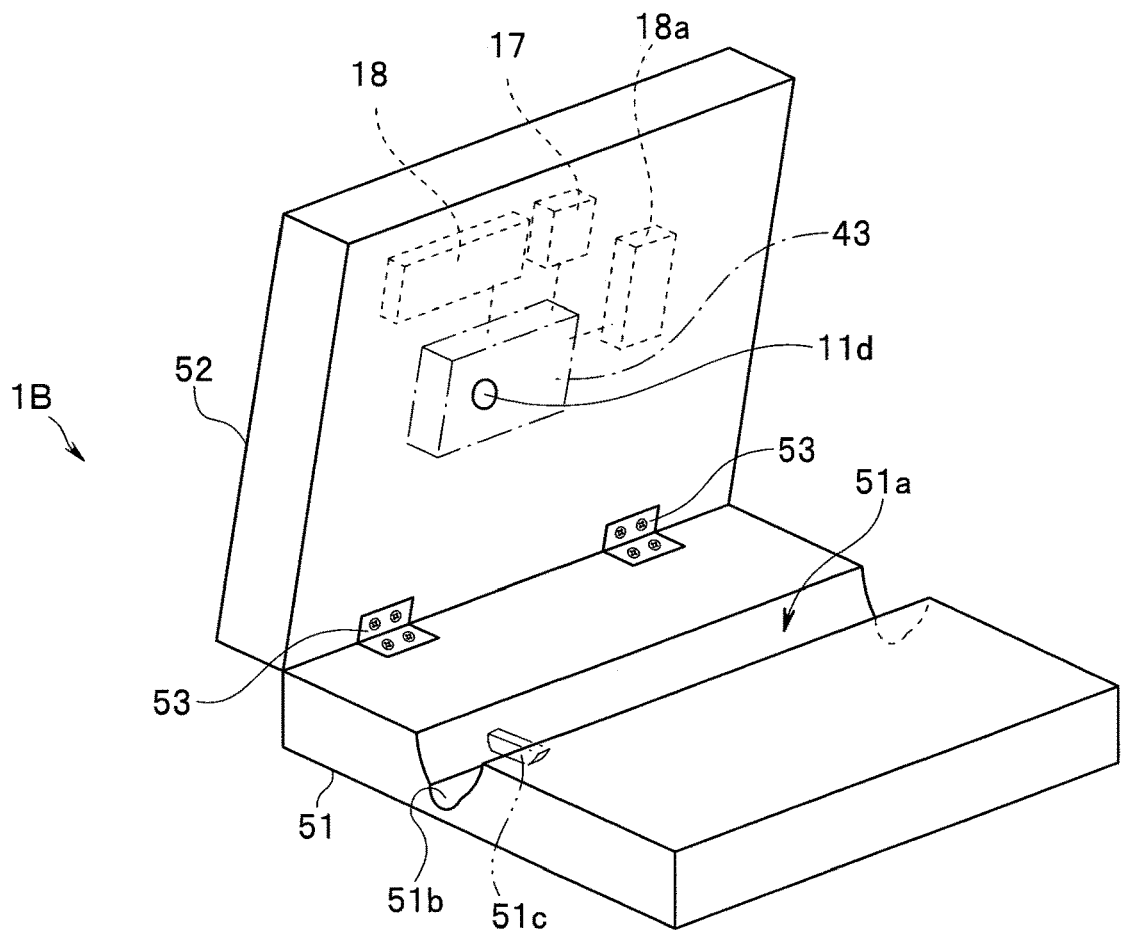
FIG. 13 shows a perspective view of an endoscope contamination detection device according to a third embodiment.
Figure 14:
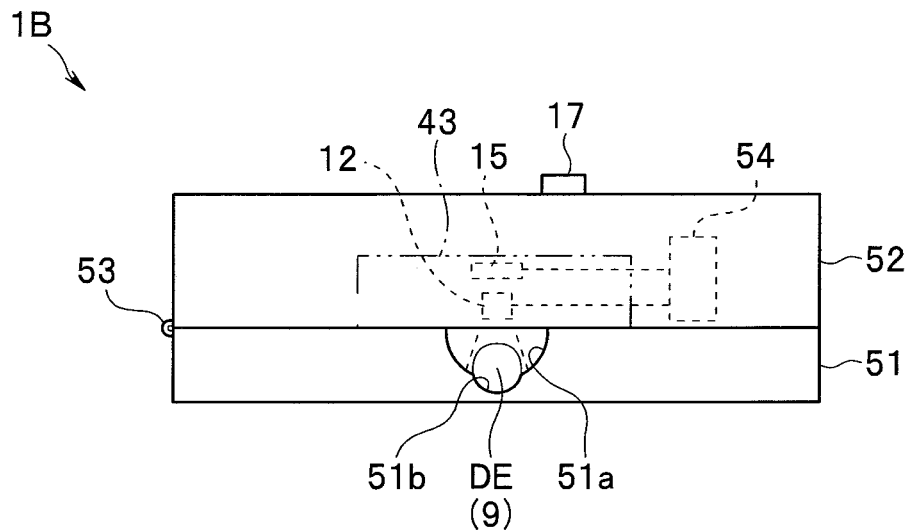
FIG. 14 shows a side view of the endoscope contamination detection device according to the third embodiment.

In the following description, the same components as those in the first and second embodiments are designated by the same reference numerals, and the description will be omitted. FIG. 13 is a perspective view of a contamination detection device 1B according to the third embodiment. FIG. 14 is a side view of the contamination detection device 1B according to the third embodiment. FIG. 13 is a perspective view of the contamination detection device 1B in a state in which a lid is opened. FIG. 14 shows a state in which the distal end portion DE of the insertion portion IP of the endoscope 9 that is an object to be inspected is set in the contamination detection device 1B.

The contamination detection device 1B includes a stage 51 for setting the distal end portion DE of the insertion portion IP, and a lid 52. The stage 51 has a plate-shaped rectangular parallelepiped shape, and an elongated groove portion 51a is formed in an upper surface. In the groove portion 51a, a fixing groove 51b for fixing the insertion portion IP is formed in the longitudinal direction of the groove portion 51a. The stage 51 and the lid 52 are configured so that the lid 52 can be opened and closed with respect to the stage 51 by two hinge members 53.

The lid 52 also has a plate-shaped rectangular parallelepiped shape, and the observation window 11d is formed on a lower surface of the lid 52. In a rear side of the observation window 11d, there are built the objective optical system 12, the light source 13, the light irradiation optical system 13a, the light splitter 14, the objective optical system 12, the excitation filter 21, the dichroic mirror 22, the absorption filter 23, the image sensor 15, the control board 16, and the transmitter 18a, which have been each described in the first embodiment. Also in FIG. 13 and FIG. 14, the detection unit 43 provided in the lid 52 is shown by an alternate long and short dash line. The detection unit 43 includes the objective optical system 12, the light source 13, the light irradiation optical system 13a, the light splitter 14, the objective optical system 12, the excitation filter 21, the dichroic mirror 22, the absorption filter 23, the image sensor 15, and the control board 16. Furthermore, the transmitter 18a which is a wireless transmitter may be provided in the lid 52.

In addition, the operation button 17 and the indicator 18 are provided on the upper surface of the lid 52. As shown in FIG. 14, when the user arranges the distal end portion DE of the insertion portion IP of the endoscope so as to be fitted in the fixing groove 51b of the stage 51, and closes the lid 52 with respect to the stage 51, the groove portion 51a covered with the lid 52 functions as a simple dark room, and external light can be prevented from entering the observation window 11d. In this state, when the operation button 17 is operated, light from the light source 13 is applied to the distal end portion DE through the observation window 11d, as the excitation light.

Though a used endoscope is placed in the groove portion 51a, the user can easily clean the groove portion 51a by opening the lid 52.

If a protruding portion 51c (indicated by a long dashed double-short dashed line) for positioning is provided in the groove portion 51a or the fixing groove 51b, it is possible to arrange the distal end portion DE at an appropriate position in a longitudinal direction of the insertion portion IP. In other words, due to the protruding portion 51c, it becomes easy for the user to position the insertion portion IP.

Fluorescence from the distal end portion DE forms an image on the image pickup plane of the image sensor 15. The output processing unit 19c generates an output signal IS based on the binarized image which has been generated in the image processing unit 19b, and outputs the signal to the indicator 18.

The contamination detection device 1B may include a distance adjustment mechanism that adjusts the image pickup distance between the endoscope which is the object and the irradiation unit or a light receiving unit, in order to appropriately form the fluorescence image on the image pickup plane of the image sensor 15, according to the differences of the outer diameters of the insertion portion IP and the distal end portion DE, or the like. In FIG. 14, a distance adjustment mechanism 54 serving as the distance adjustment unit automatically or manually moves at least one lens of the objective optical system 12, or the image sensor 15 serving as the light receiving unit, in an optical axis direction of the objective optical system 12. The distance adjustment mechanism 54 can be configured by a motor, a gear, and a rack and pinion mechanism, for example. The distance adjustment mechanism 54 for manual adjustment moves a lens or the like, when the user operates an unillustrated operation switch. In the distance adjustment mechanism 54 for automatic adjustment, a distance to the distal end portion DE is measured by an unillustrated distance sensor, and the lens or the like moves based on the measured distance.

The output processing unit 19c may be configured to transmit the output signal IS from the transmitter 18a to an external device. For example, the output signal IS is transmitted to a PC, and the message is displayed on a monitor of the PC. Alternatively, the output signal IS is transmitted to the endoscope reprocessor, and the cleaning time period and the like are automatically set according to the output signal IS.

As described in the first embodiment, the contamination detection device 1B of the present embodiment may also transmit the image data of the fluorescence image as the output signal IS, and/or cause the processor 19 of the detection unit 43 to perform inference by using an inference model using the deep learning.

Therefore, the contamination detection device 1B of the third embodiment can also obtain the same effect as the contamination detection device 1 of the above described first embodiment.

Fourth Embodiment

The contamination detection device of the first embodiment has a stick shape, but a contamination detection device of a fourth embodiment has a box shape.

Figure 15:
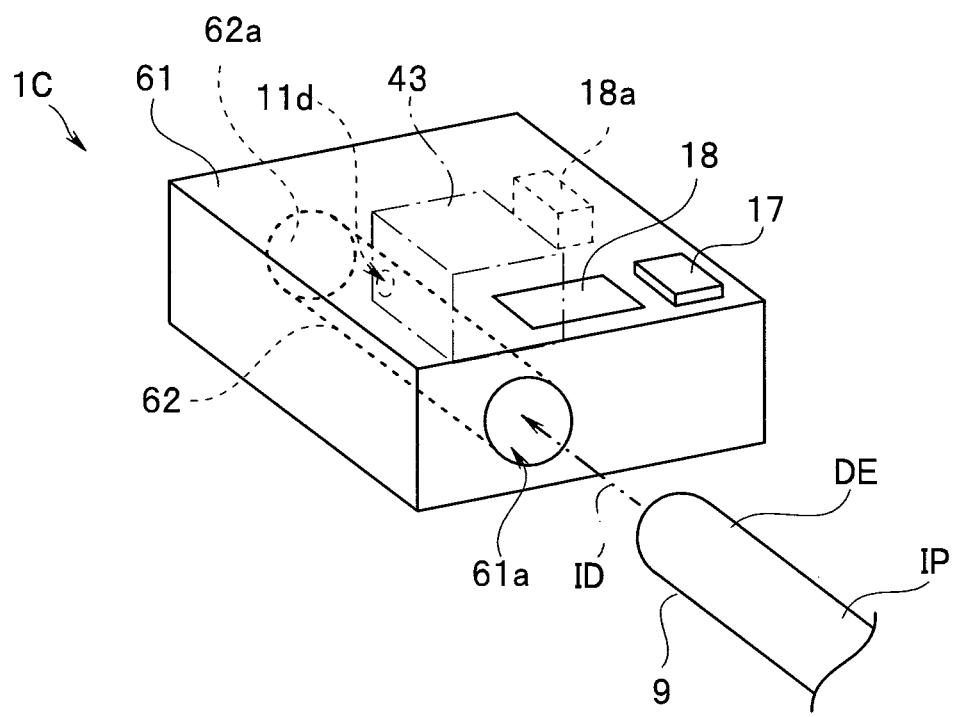
FIG. 15 shows a perspective view of a contamination detection device according to a fourth embodiment.

In the following description, the same components as those in the first and second embodiments are designated by the same reference numerals, and the description will be omitted. FIG. 15 is a perspective view of a contamination detection device 1C according to the fourth embodiment. The contamination detection device 1C includes a housing 61 having a rectangular parallelepiped shape, an opening 61a formed on one side surface of the housing 61, and the operation button 17 and the indicator 18 which are provided on an upper surface of the housing 61.

In the contamination detection device 1C, there is built a cylindrical member 62 which communicates with the opening 61a. The cylindrical member 62 has an inner diameter into which the distal end portion DE of the insertion portion IP can be inserted in a loosely fitted state, and includes a bottom portion 62a. In FIG. 15, the distal end portion DE of the insertion portion IP of the endoscope 9 can be inserted from the opening 61a into an inner part of the cylindrical member 62, as is shown by an arrow ID of a long dashed double-short dashed line.

The cylindrical member 62 includes the observation window 11d which is an opening, on an inner peripheral surface. The observation window 11d is provided at a position at which an image of the distal end portion DE can be picked up by the image sensor 15, when the insertion portion IP is inserted into the cylindrical member 62 and the distal end portion DE abuts against the bottom portion 62a of the cylindrical member 62.

As shown in FIG. 15, when the user inserts the distal end portion DE of the insertion portion IP of the endoscope from the opening 61a into the inner part of the cylindrical member 62, and operates the operation button 17, the light from the light source 13 is applied to the distal end portion DE through the observation window 11d, as the excitation light. At this time, the inner part of the cylindrical member 62 functions as a dark room. When the distal end portion DE of the insertion portion IP is inserted from the opening 61a, the distal end portion DE abuts against the bottom portion 62a of the cylindrical member 62, and accordingly, the user can easily position the distal end portion DE.

Fluorescence from the distal end portion DE forms an image on the image pickup plane of the image sensor 15. The output processing unit 19c outputs the output signal IS to the indicator 18, based on the binarized image generated in the image processing unit 19b.

In the present embodiment, as in the third embodiment described above, the contamination detection device 1C may include a distance adjustment mechanism that adjusts the image pickup distance between the objective optical system 12 and the object, in order that the fluorescence image is appropriately formed on the image pickup plane of the image sensor 15, according to the differences of the outer diameters of the insertion portion IP and the distal end portion DE, or the like.

The output processing unit 19c may be configured to transmit the output signal IS from the transmitter 18a to an external device. For example, the output signal IS is transmitted to a PC, and the message is displayed on a monitor of the PC. Alternatively, the output signal IS is transmitted to the endoscope reprocessor, and the cleaning time period and the like are automatically set according to the output signal IS.

As described in the first embodiment, the contamination detection device 1C of the present embodiment may also transmit the image data of the fluorescence image as the output signal IS, and/or cause the processor 19 of the detection unit 43 to perform inference by using an inference model using the deep learning.

Therefore, the contamination detection device 1C of the fourth embodiment can also obtain the same effect as the contamination detection device 1 of the above described first embodiment.

Fifth Embodiment

The endoscope contamination detection devices in the first to fourth embodiments are so-called portable, but an endoscope contamination detection device in a fifth embodiment is built in an endoscope reprocessor 1D. In other words, the endoscope reprocessor 1D of the fifth embodiment has an endoscope contamination detection function.

Figure 16:
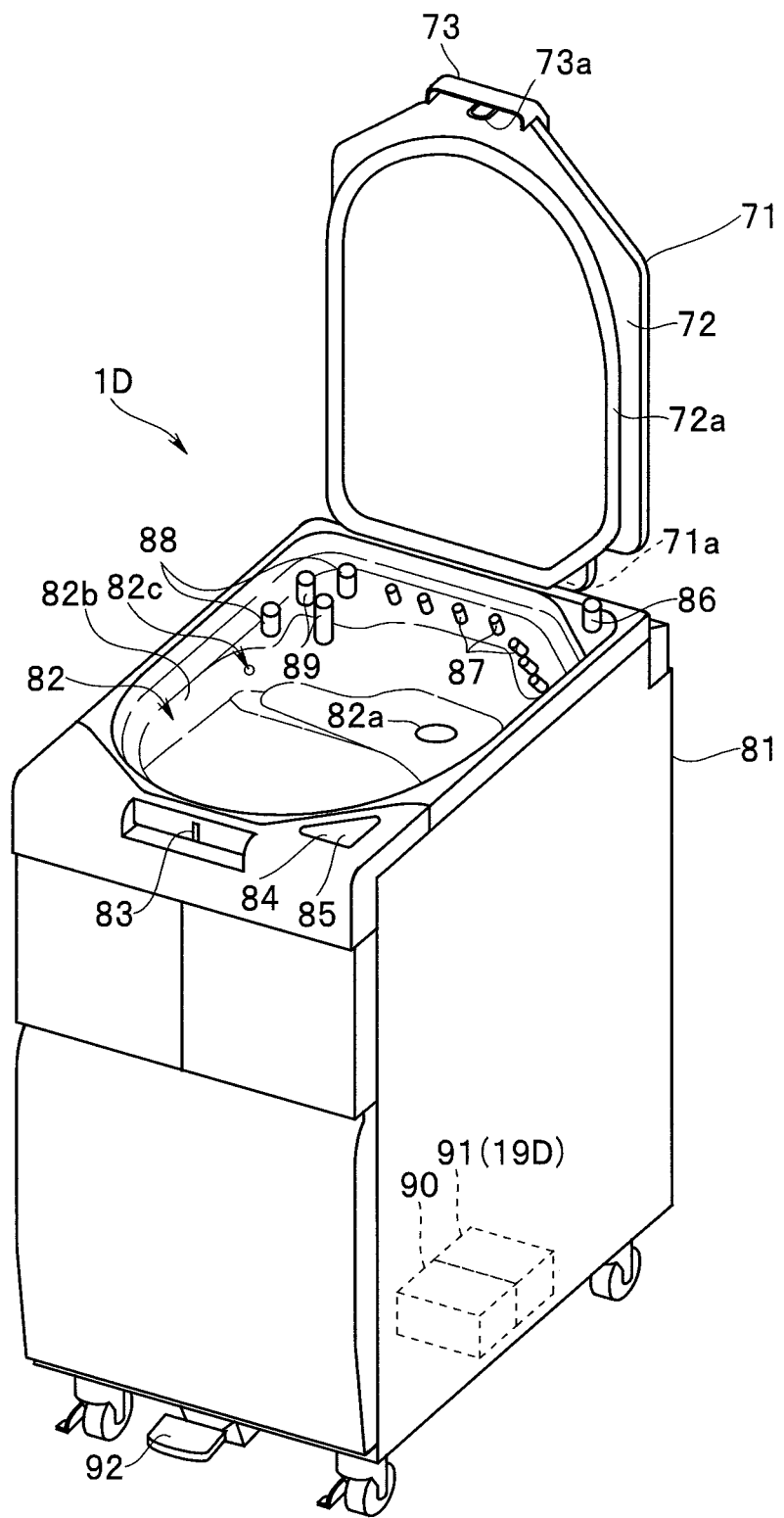
FIG. 16 shows a perspective view of an endoscope reprocessor having an endoscope contamination detection function, according to a fifth embodiment.

In the following description, the same components as those in the first to fourth embodiments are designated by the same reference numerals, and the description will be omitted. FIG. 16 is a perspective view of the endoscope reprocessor 1D having an endoscope contamination detection function, according to the fifth embodiment. The endoscope reprocessor 1D is an apparatus for performing reprocessing of a contaminated endoscope, and components or accessory components of the endoscope. The reprocessing referred to here is not particularly limited, and may be any of rinsing with water, cleaning for removing contamination such as organic matter, disinfection for invalidating predetermined microorganisms, sterilization for eliminating or killing all microorganisms, or a combination of these. Furthermore, the endoscope reprocessor 1D can be used for reprocessing of a dilator which is a tubular medical device, an endoscope sheath or the like.

In the present embodiment, the endoscope reprocessor 1D includes a top cover 71 having a transparent portion and a reprocessor main body 81. The top cover 71 is arranged so that the back surface faces a treatment tank 82 of the reprocessor main body 81. The top cover 71 can be opened and closed with respect to the treatment tank 82 by rotation around a hinge 71a. Specifically, one end of the top cover 71 is connected to the reprocessor main body 81 by the hinge 71a, and the other end rotates around the one end. The top cover 71 includes a cover frame 72 provided with a packing 72a. When the top cover 71 becomes a closed state, the top cover 71 covers the treatment tank 82. The top cover 71 includes a finger hook portion 73.

The finger hook portion 73 is made of a material such as metal or resin. The finger hook portion 73 is connected to the other end side of the top cover 71 so that the user can hook his/her finger on the finger hook portion 73. A fastener 73*a* is provided in the inside of the finger hook portion 73.

The reprocessor main body 81 further includes the treatment tank 82, a lock unit 83, a display unit 84, an operation portion 85, a water supply hose connection port 86, various connectors 87, various nozzles 88, a water level meter 89, a communication unit 90, and a control unit 91.

The treatment tank 82 is a reprocessing unit that is a place in which the endoscope is subjected to reprocessing. A circulation port 82*a* is provided in the bottom surface S of the treatment tank 82.

The lock unit 83 is provided at the other end side of the upper portion of the reprocessor main body 81. The lock unit 83 latches the fastener 73*a* or releases the latch of the fastener 73*a*, under the control of the control unit 91. When the lock unit 83 latches the fastener 73*a*, the top cover 71 is locked in a closed state. It is also acceptable to configure the lock unit 83 so as to be connected to a foot panel 92 and be capable of releasing the latch of the fastener 73*a* by an operation of the foot panel 92.

The display unit 84 is provided at a corner portion of the other end side of the upper portion of the reprocessor main body 81. The display unit 84 includes a display panel, and provides various notifications to the user, under the control of the control unit 91. The operation portion 85 includes an instruction input button, and the user can input various instructions to the endoscope reprocessor 1D through the operation portion 85. The water supply hose connection port 86 is connected to a water tap via an unillustrated water supply tube.

The communication unit 90 is connected to the control unit 91, and is configured so as to be capable of communicating with an external device such as a personal computer via a network in a wired or wireless manner, under the control of the control unit 91.

The control unit 91 controls each unit in the endoscope reprocessor 1D and controls execution of the reprocessing of the endoscope. The control unit 91 includes a processor 19D and a memory, and can execute various programs stored in the memory. The functions of the control unit 91 are implemented by reading and executing programs stored in the memory, and thereby functions of the endoscope reprocessor 1D such as cleaning are realized.

The used endoscope is held in a dedicated holding net (not illustrated) for holding the endoscope, and is installed in the treatment tank 82. More specifically, the endoscope is held in such a way that the insertion portion and a cable are wound in the holding net. The endoscope is latched to the holding net in a predetermined posture and shape so that the operation portion, the insertion portion, the cable and the like are positioned at a predetermined position in the treatment tank 82. The holding net is made from a material of metal or resin, for example, and is attached to the bottom portion of the treatment tank 82. Then, the holding net which holds the endoscope is set in the treatment tank 82, and the endoscope is subjected to cleaning or the like in the treatment tank 82.

On a side surface 82*b* of the treatment tank 82, an observation window 82*c* is provided. The observation window 82*c* has the same function as the observation window 11*d* in the first embodiment.

Figure 17:
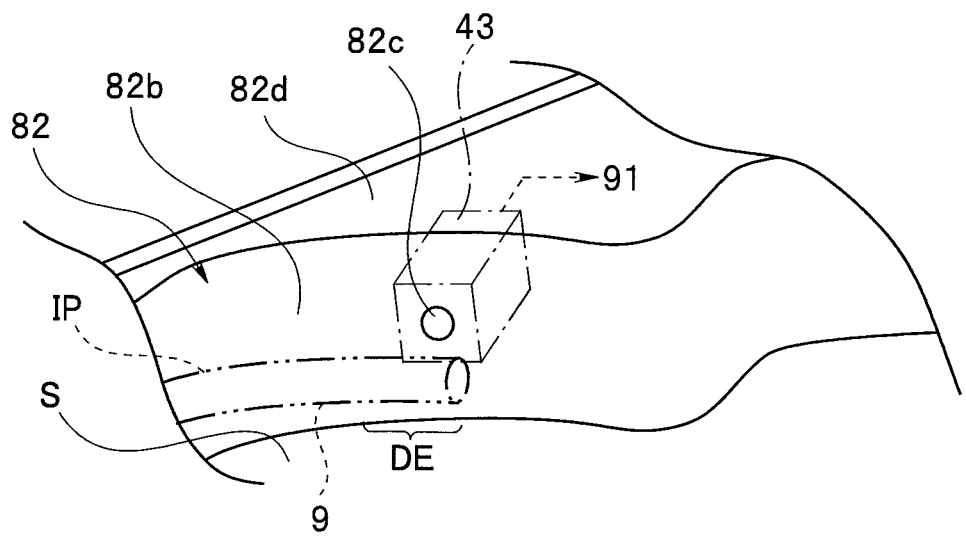
FIG. 17 shows a perspective view of a side surface portion of a treatment tank of the endoscope reprocessor according to the fifth embodiment.

FIG. 17 is a perspective view of a side surface portion of the treatment tank 82 of the endoscope reprocessor 1D, according to the present embodiment. As is shown in FIG. 17, the side surface 82*b* is a wall portion that connects a terrace portion 82*d* in which various nozzles 88 and the like are provided, with the bottom surface S of the treatment tank 82. The detection unit 43 is arranged on a rear side of the observation window 82*c*. The detection unit 43 includes the light source 13, the light irradiation optical system 13*a*, the light splitter 14, the objective optical system 12, the excitation filter 21, the dichroic mirror 22, the absorption filter 23, the image sensor 15, and the control board 16. The operation of the detection unit 43 is controlled by the control unit 91.

In other words, the contamination detection device 1 (except for indicator 18) in the first embodiment is built in the endoscope reprocessor 1D. In addition, the observation window 82*c* is provided on the side surface 82*b* of the treatment tank 82 of the endoscope reprocessor 1D, for the irradiation unit that emits light having the specific wavelength toward the inside of the treatment tank 82 and the light receiving unit that receives the fluorescence.

It is also acceptable to provide the observation window 82*c* at a position at which, when the holding net that holds the endoscope 9 is set in the treatment tank 82, an image of the distal end portion DE (indicated by a long dashed double-short dashed line) of the insertion portion IP is picked up by the image sensor 15.

The user positions the distal end portion DE of the endoscope in the vicinity of the observation window 82*c*, before causing the endoscope reprocessor 1D to reprocess the endoscope 9, acquires a fluorescence image of the distal end portion DE, and causes the detection unit 43 to determine the contamination degree of the distal end portion DE. More specifically, the user positions the distal end portion DE of the endoscope in the vicinity of the observation window 82*c*, performs a predetermined operation on the operation portion 85, and causes the control unit 91 to operate the detection unit 43. The detection unit 43 causes the light source 13 to irradiate the distal end portion DE with light as the excitation light through the observation window 82*c*, and fluorescence from the distal end portion DE forms an image on the image pickup plane of the image sensor 15. The output processing unit 19*c* outputs the output signal IS to the control unit 91, based on the binarized image generated in the image processing unit 19*b*. The output signal IS is stored in the control unit 91.

Then, the user sets the holding net which holds the endoscope, in the treatment tank 82. The user operates the operation portion 85 and instructs the control unit 91 to execute reprocessing. As a result, the endoscope reprocessor 1D reprocesses the endoscope.

When the reprocessing is executed, the control unit 91 determines the reprocessing time period, based on the output signal IS. For example, when there is no contamination, the cleaning time period is set to a predetermined time period according to the set endoscope. When there is the contamination, the cleaning time period is set according to the contamination degree. The cleaning time period is set to be long when the contamination degree is high.

Specifically, when the contamination degree of the endoscope is lower than a predetermined value, or when there is no contamination, the control unit 91 executes the reprocessing (first processing) by a first program for a predetermined first reprocessing time period; and when the contamination degree of the endoscope is the predetermined value or higher, or when there is the contamination, the control unit 91 executes the reprocessing (second processing) by a second program for a predetermined second reprocessing time period. The reprocessing by the second program is a reprocessing of a level higher than the reprocessing level by the first program. For example, the processing time period of the reprocessing by the second program is longer than the processing time period of the reprocessing by the first program.

The contamination degree may be determined in the output processing unit 19c, or the contamination degree of the endoscope may also be determined in the control unit 91, after a binarized image has been transmitted to the control unit 91. In this case, the control unit 91 executes a detection processing program of the contamination degree, which serves as a detection unit of the contamination degree for determining the contamination degree of the endoscope from the binarized image.

As described above, it is also acceptable to provide the observation window 82c at a position at which when the holding net that holds the endoscope is set in the treatment tank 82, an image of the distal end portion DE (indicated by a long dashed double-short dashed line) of the insertion portion IP is picked up by the image sensor 15. In this case, it is also acceptable that when the user sets the holding net which holds the endoscope in the treatment tank 82, and then operates the operation portion 85 so as to execute the reprocessing, the detection device firstly determines the above described contamination degree, and then automatically sets the reprocessing time period and executes the reprocessing continuously.

As described above, according to the present embodiment, the processor 19D determines the contamination degree of the distal end unit DE, before the execution of the reprocessing, and the endoscope reprocessor 1D executes the endoscope reprocessing according to the determination result of the contamination degree. When there is no contamination on the distal end portion DE or the contamination degree is low, the processing time period becomes a normal setting time period, and the cleaning of the endoscope or the like is performed in the normal setting time period. On the other hand, when there is the contamination on the distal end portion DE and the contamination degree is high, the processing time period is longer than the normal setting time period, and the cleaning of the endoscope or the like is performed in a longer time period than the normal setting time period.

In the present embodiment, as in the third embodiment described above, the endoscope reprocessor 1D may include a distance adjustment mechanism that adjusts the image pickup distance between the endoscope which is the object and the irradiation unit or the light receiving unit, in order that the fluorescence image is appropriately formed on the image pickup plane of the image sensor 15, according to the differences of the outer diameters of the insertion portion IP and the distal end portion DE, or the like.

Figure 18:
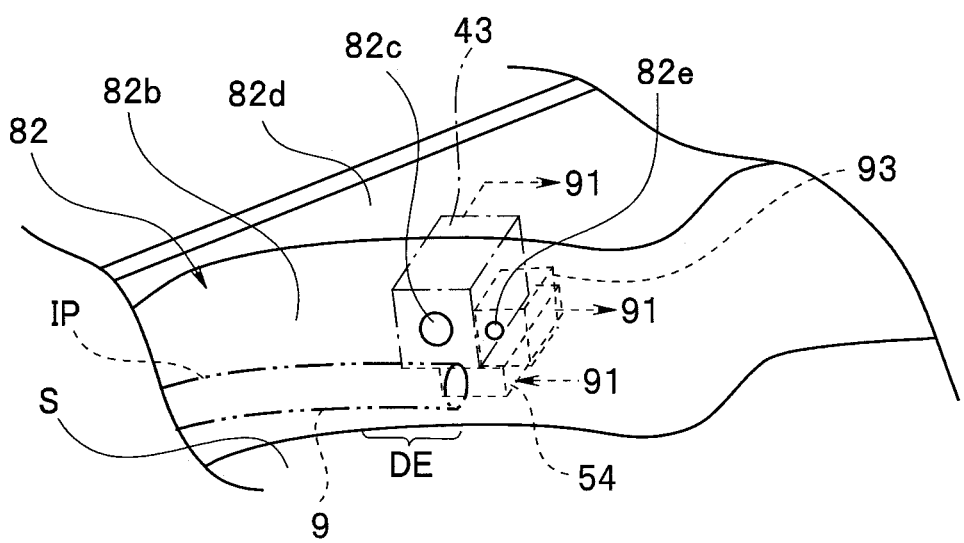
FIG. 18 shows a perspective view of a side surface portion of a treatment tank, which shows a distance adjustment mechanism for adjusting an image pickup distance between an objective optical system and an object, according to a modification of the fifth embodiment.

FIG. 18 is a perspective view of the side surface portion of the treatment tank 82, which shows the distance adjustment mechanism for adjusting an image pickup distance between the objective optical system 12 and the object, according to a modification of the fifth embodiment. In the vicinity of the observation window 82c of the treatment tank 82, a sensor window 82e for a distance sensor is provided through which infrared light for distance detection is emitted and enters.

A distance detector 93 is arranged behind the sensor window 82e. The distance detector 93 includes an infrared light emitting element, an infrared light receiving element, and a distance calculation circuit that calculates a distance based on a detection signal of the infrared light which the light receiving element has received. Furthermore, the distance detector 93a includes a distance adjustment mechanism 54 for adjusting an image pickup distance between the objective optical system 12 and the object. The distance adjustment mechanism 54 includes a motor, a gear, a rack and pinion mechanism, and the like.

The control unit 91 controls the motor of the distance adjustment mechanism 54 according to the output signal of the distance detector 93, and automatically moves, for example, the image sensor 15 or the objective optical system 12, in the optical axis direction of the objective optical system 12.

Furthermore, also in the endoscope reprocessor 1D of the present embodiment, as described in the first embodiment, the processor 19D may be configured to perform inference using an inference model using the deep learning.

Therefore, the endoscope reprocessor 1D of the fifth embodiment can reprocess the endoscope in response to the contamination of the distal end portion DE.

As described above, according to each of the above described embodiments, it is possible to provide the endoscope contamination detection device for detecting the contamination of the endoscope, the endoscope reprocessor and the endoscope contamination detection method, which do not require complicated work.

The present invention is not limited to the above described embodiments, and various changes, modifications, and the like can be made without changing the gist of the present invention.

What is claimed is:

1. An endoscope contamination detection device comprising:
    a light source configured to irradiate an endoscope with light having a specific wavelength;
    an image sensor configured to receive a fluorescence emitted by a deposit adhering to a surface of the endoscope; and
    a processor comprising hardware, wherein the processor is configured to:
        acquire a signal corresponding to the fluorescence from the image sensor;
        generate an image from the signal;
        detect luminance values of a plurality of pixels of the image; and
        determine a contamination degree of the endoscope based on the luminance values using an inference model created from at least one of a plurality of fluorescence images or a plurality of emphasized images,
        wherein the signal is acquired while a constant distance is maintained between the image sensor and the endoscope.

2. The endoscope contamination detection device according to claim 1, wherein the image is at least one of a fluorescence image or an emphasized image generated based on the fluorescence image.

3. The endoscope contamination detection device according to claim 2, wherein:
    the emphasized image is a binarized image generated by binarization processing; and
    the contamination degree is determined based on the luminance values of the binarized image.

4. The endoscope contamination detection device according to claim 2, wherein the processor is configured to:
    detect luminance values of a plurality of pixels of the emphasized image; and
    determine the contamination degree from a ratio of a number of pixels having luminance values of a predetermined threshold or higher to a total number of pixels.

5. The endoscope contamination detection device according to claim 1, wherein the processor is configured to output a determination result of the contamination degree to an endoscope reprocessor.

6. The endoscope contamination detection device according to claim 1, wherein the specific wavelength is 360 nm or longer.

7. The endoscope contamination detection device according to claim 1, wherein the specific wavelength is 460 nm or longer.

8. The endoscope contamination detection device according to claim 7, further comprising an excitation filter transmitting light having a wavelength of 460 nm or longer and an absorption filter transmitting light having a wavelength of 510 to 550 nm.

9. The endoscope contamination detection device according to claim 7, further comprising an excitation filter transmitting light having a wavelength of 530 nm or longer and an absorption filter transmitting light having a wavelength of 575 to 625 nm.

10. The endoscope contamination detection device according to claim 1, further comprising:
a portable housing in which the image sensor is arranged; and
a positioning member protruding from the portable housing,
wherein the positioning member is configured to position the image sensor a constant distance from the endoscope.

11. A control device comprising:
a processor comprising hardware, the processor being configured to:
acquire a signal corresponding to a fluorescence from an image sensor, the fluorescence emitted by a deposit adhering to an endoscope surface of an endoscope;
generate an image from the signal;
detect luminance values of a plurality of pixels of the image; and
determine a contamination degree of the endoscope based on the luminance values using an inference model created from at least one of a plurality of fluorescence images or a plurality of binarized images,
wherein the signal is acquired while a constant distance is maintained between the image sensor and the endoscope.

12. The control device according to claim 11, wherein the processor is configured to:
cause an endoscope reprocessor to execute a first program when the contamination degree is lower than a predetermined value; and
cause the endoscope reprocessor to execute a second program having a processing level higher than a processing level of the first program, when the contamination degree is the predetermined value or higher.

13. The control device according to claim 11, wherein the image is at least one of a fluorescence image or an emphasized image generated based on the fluorescence image.

14. The control device according to claim 11, wherein the processor is configured to acquire a signal of an image picked up at a wavelength of 530 nm or longer.

15. An endoscope contamination detection method comprising:
acquiring a signal corresponding to a fluorescence emitted by a deposit adhering to a surface of an endoscope irradiated with light having a specific wavelength;
generating an image from the signal;
detecting luminance values of a plurality of pixels of the image; and
determining a contamination degree of the endoscope based on the luminance values using an inference model created from at least one of a plurality of fluorescence images or a plurality of binarized images,
wherein the signal is acquired while a constant distance is maintained between an image sensor receiving the fluorescence and the endoscope.

16. The endoscope contamination detection method according to claim 15, further comprising:
causing an endoscope reprocessor to execute:
first processing when the contamination degree is lower than a predetermined value; and
second processing having a processing level higher than a processing level of the first processing when the contamination degree is the predetermined value or higher.

17. The endoscope contamination detection method according to claim 15, wherein the endoscope includes a pivotable raising base in a distal end, the endoscope contamination detection method further comprising:
when a rotation angle of the pivotable raising base is a first angle, emitting light having the specific wavelength; and
when the rotation angle of the pivotable raising base is a second angle different from the first angle, emitting the light having the specific wavelength.

18. The endoscope contamination detection method according to claim 15, wherein the deposit is blood or bile.

* * * * *